(12) United States Patent
Shigeta

(10) Patent No.: US 10,430,935 B2
(45) Date of Patent: Oct. 1, 2019

(54) IMAGING APPARATUS, IMAGING SYSTEM, MOVABLE BODY, AND CHIP

(71) Applicant: CANON KABUSHIKI KAISHA, Tokyo (JP)

(72) Inventor: Kazuyuki Shigeta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/956,255

(22) Filed: Apr. 18, 2018

(65) Prior Publication Data

US 2018/0315175 A1 Nov. 1, 2018

(30) Foreign Application Priority Data

Apr. 27, 2017 (JP) ................. 2017-088510

(51) Int. Cl.
| | |
|---|---|
| G06T 5/50 | (2006.01) |
| G06T 7/20 | (2017.01) |
| G08G 1/16 | (2006.01) |
| G06T 7/11 | (2017.01) |
| H04N 7/18 | (2006.01) |
| G06T 1/20 | (2006.01) |

(Continued)

(52) U.S. Cl.
CPC ............ *G06T 5/50* (2013.01); *G06K 9/00624* (2013.01); *G06K 9/00973* (2013.01); *G06K 9/3233* (2013.01); *G06T 1/20* (2013.01); *G06T 7/11* (2017.01); *G06T 7/20* (2013.01); *G08G 1/166* (2013.01); *H04N 7/183* (2013.01); *G06K 9/00791* (2013.01)

(58) Field of Classification Search
None
See application file for complete search history.

(56) References Cited

U.S. PATENT DOCUMENTS 5,694,486 A * 12/1997 Shigeeda .............. G06T 3/0006
358/450
6,148,101 A * 11/2000 Tanaka ...................... G06T 1/20
382/156

(Continued)

FOREIGN PATENT DOCUMENTS

| JP | 2000-184229 A | 6/2000 |
|---|---|---|
| JP | 2013-176073 A | 9/2013 |

(Continued)

*Primary Examiner* — James M Hannett
(74) *Attorney, Agent, or Firm* — Canon U.S.A., Inc. IP Division

(57) ABSTRACT

An imaging apparatus includes an imaging unit configured to output an image signal, a first image processing unit, and a second image processing unit. The first image processing unit includes a first signal processing unit that generates a first image signal from the input image signal, and a second image signal including a smaller number of signals than signals included in the first image signal and corresponding to a first imaging region. The second image processing unit includes a second input portion that receives the first image signal from a first output portion and a second signal processing unit. The second signal processing unit generates, from the first image signal, a third image signal that includes a smaller number of signals than the signals included in the first image signal and corresponds to a second imaging region that is only a part of the first imaging region.

20 Claims, 10 Drawing Sheets

(51) Int. Cl.
*G06K 9/00* (2006.01)
*G06K 9/32* (2006.01)

(56) References Cited

U.S. PATENT DOCUMENTS

| | | | |
|---|---|---|---|
| 10,204,396 B2* | 2/2019 | Meixner | G06F 9/3887 |
| 2016/0140700 A1* | 5/2016 | Park | G06T 5/005 |
| | | | 382/275 |

FOREIGN PATENT DOCUMENTS

| | | |
|---|---|---|
| JP | 2017-55217 A | 3/2017 |
| JP | 2017-111470 A | 6/2017 |

* cited by examiner

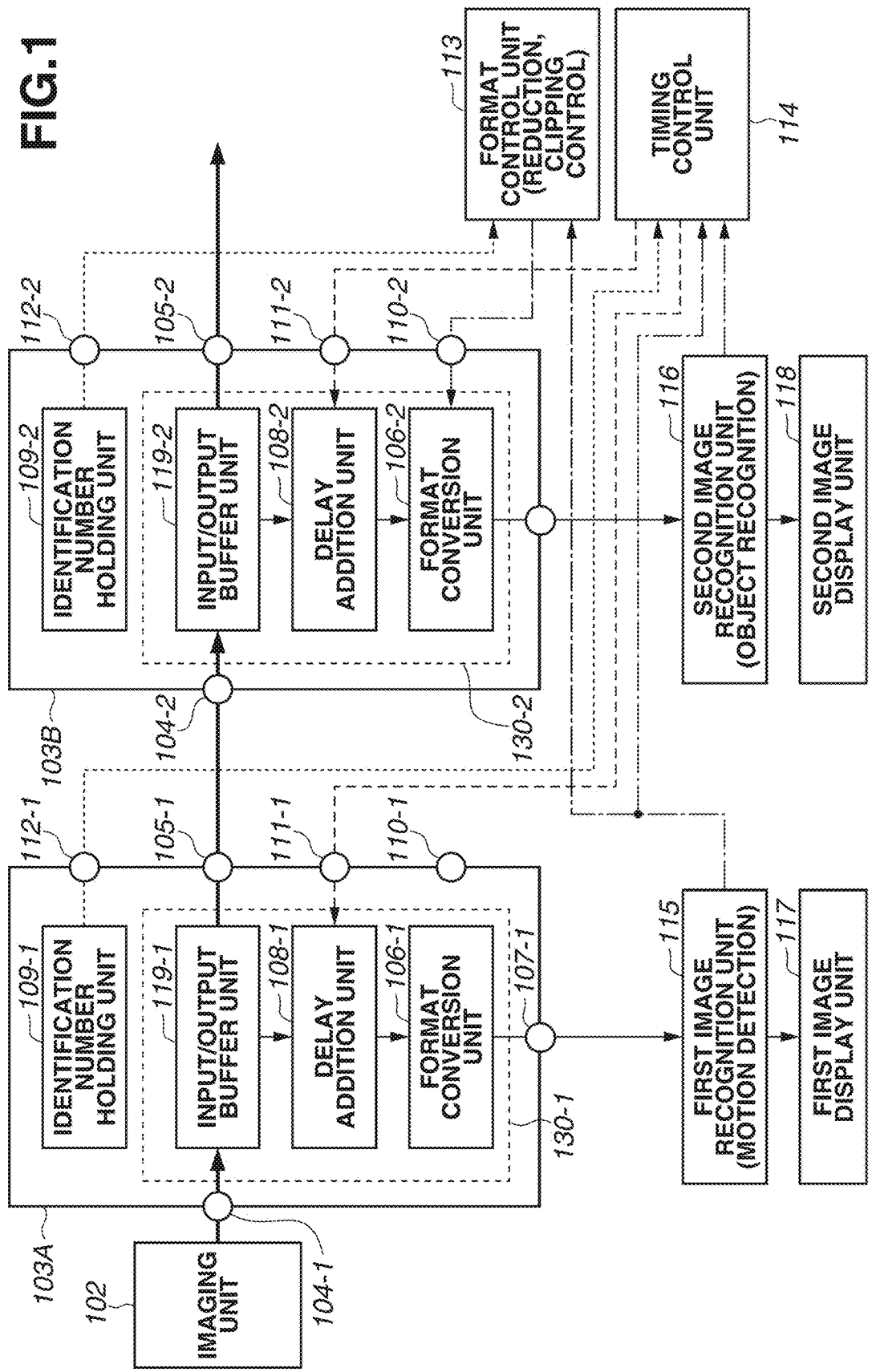

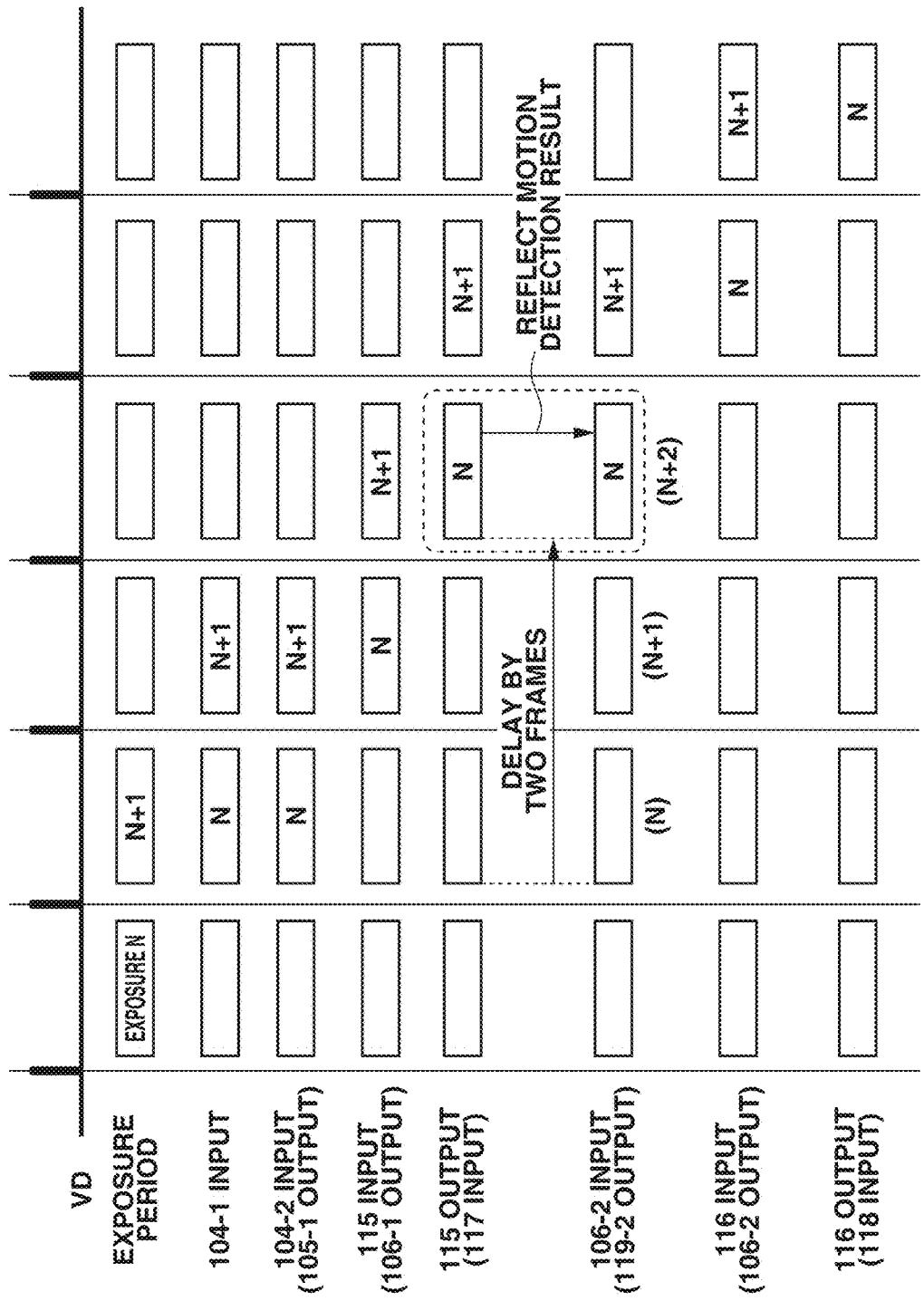

COMPARATIVE EXAMPLE

FIRST EXEMPLARY EMBODIMENT

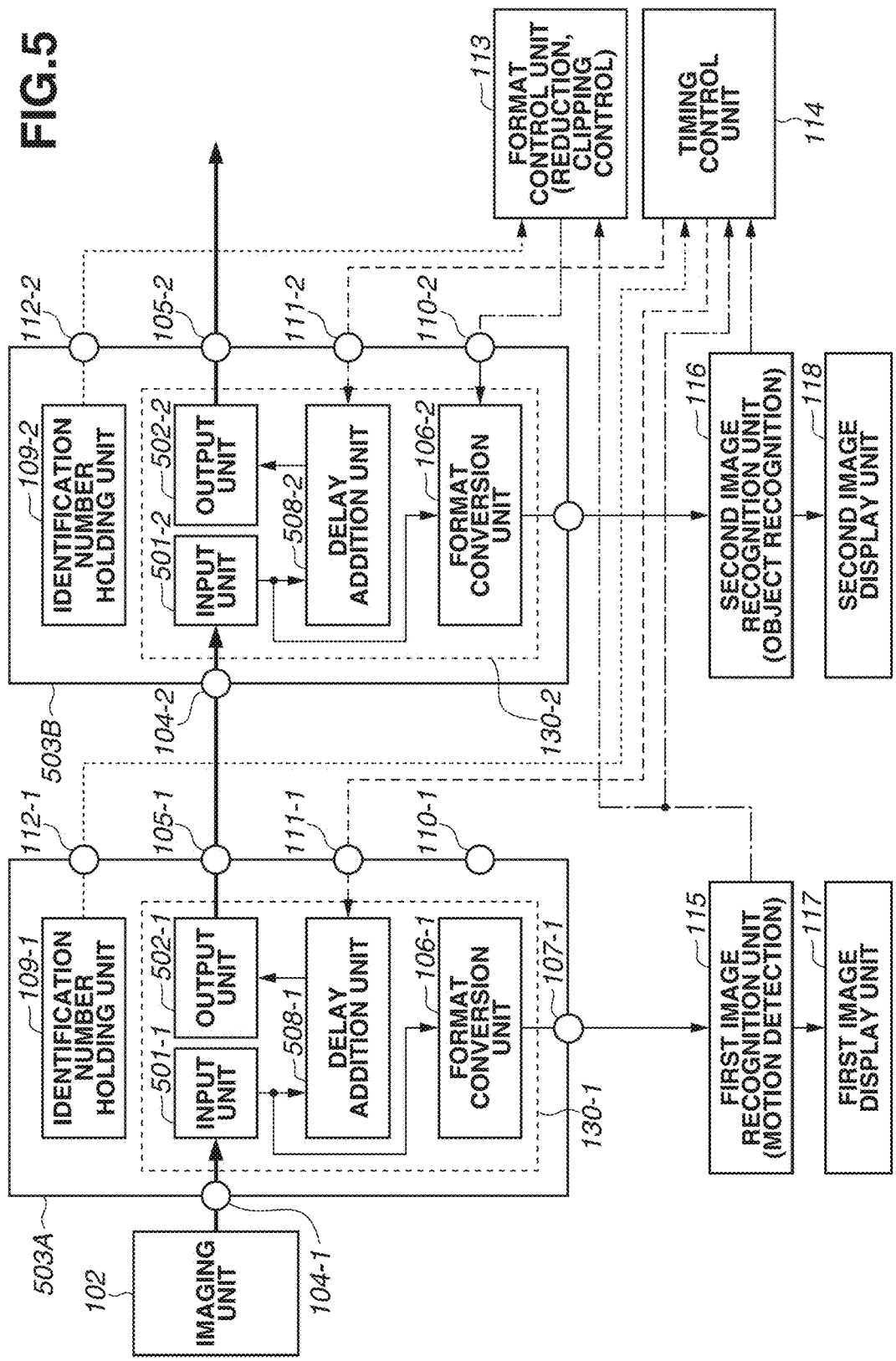

IMAGING APPARATUS, IMAGING SYSTEM, MOVABLE BODY, AND CHIP

BACKGROUND OF THE INVENTION

Field of the Invention

The present disclosure relates to an imaging device, an imaging system, a movable body, and a chip.

Description of the Related Art

An image processing apparatus for processing an image signal output from an imaging device is well-known. Japanese Patent Application Laid-Open No. 2000-184229 discusses a configuration of image processing apparatuses connected in series with one another.

Japanese Patent Application Laid-Open No. 2000-184229 discusses an operation in which an image signal processed by one image processing apparatus connected in series with each other, is processed by the other image processing apparatus. Further, Japanese Patent Application Laid-Open No. 2000-184229 discusses an operation in which one image processing apparatus processes the image signal captured in a certain period while the other image processing apparatus processes the image signal captured in a different period.

In recent years, in an imaging apparatus including an imaging device and an image processing device, a need for generating a whole image and a partial image that is an extracted part (e.g., person and vehicle) of the whole image for, for example, a monitor camera has been increased.

In the image processing apparatus discussed in Japanese Patent Application Laid-Open No. 2000-184229, the configuration including a plurality of image processing units that performs different image processing from one another has not been sufficiently examined. In particular, the configuration including the plurality of image processing units in a case where a part of a range of a signal (imaging region, imaging time, and color information) processed by one image processing unit is processed by the other image processing unit, has not been sufficiently examined.

SUMMARY OF THE INVENTION

According to an aspect of the present invention, an imaging apparatus, includes an imaging unit configured to output an image signal, a first image processing unit, and a second image processing unit, wherein the first image processing unit includes a first input portion configured to receive the image signal, a first signal processing unit configured to generate a first image signal from the image signal input to the first input portion, and a second image signal including a smaller number of signals than signals included in the first image signal and corresponding to a first imaging region, a first output portion configured to output the first image signal to outside of the first image processing unit, and a second output portion configured to output the second image signal to the outside of the first image processing unit, and wherein the second image processing unit includes a second input portion configured to receive the first image signal from the first output portion, a second signal processing unit configured to generate a third image signal from the first image signal input to the second input portion, the third image signal including a smaller number of signals than the signals included in the first image signal and corresponding to a second imaging region that is a part of the first imaging region, and a third output portion configured to output the third image signal to outside of the second image processing unit.

Further features of the present invention will become apparent from the following description of exemplary embodiments with reference to the attached drawings.

BRIEF DESCRIPTION OF THE DRAWINGS

FIG. 1 is a block diagram illustrating a configuration of an imaging apparatus.

FIG. 2 is a diagram illustrating an operation of the imaging apparatus.

FIG. 5 is a block diagram illustrating a configuration of the imaging apparatus.

DESCRIPTION OF THE EMBODIMENTS

Figure 3A:
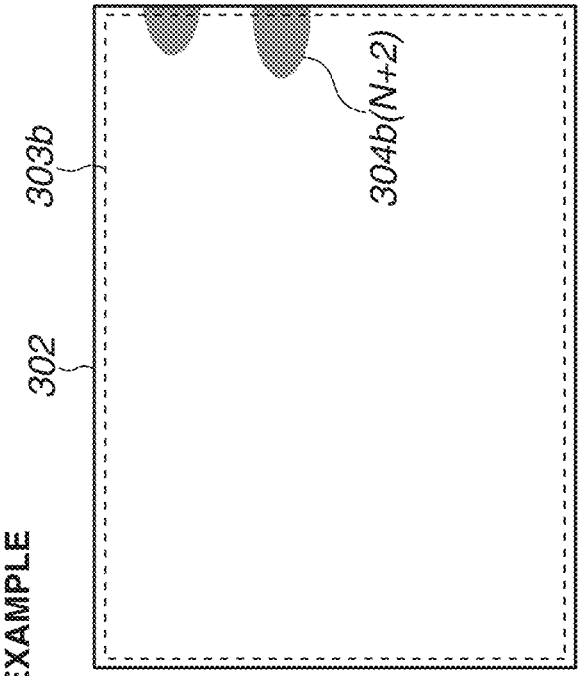
FIGS. 3A and 3B are diagrams each illustrating image processing of a comparative example.

An imaging apparatus according to exemplary embodiments is described below with reference to the drawings.

FIG. 1 is a schematic diagram illustrating a configuration of an imaging apparatus according to a first exemplary embodiment.

In the imaging apparatus of FIG. 1, an imaging unit 102 includes a plurality of pixels. In the present exemplary embodiment, the imaging unit 102 is a complementary metal-oxide semiconductor (CMOS) sensor that includes 12000 pixels in a horizontal direction and 9000 pixels in a vertical direction (12K9K), i.e., includes about one hundred million pixels in total. The imaging unit 102 outputs an image signal including 12K9K pixels, to an image processing unit 103A.

An image processing unit 103B is connected in series with the image processing unit 103A. The image processing unit 103A is included in a first chip. Further, the image processing unit 103B is included in a second chip that is different from the first chip. The image processing unit 103A and the image processing unit 103B include the same configuration. In other words, the imaging apparatus according to the present exemplary embodiment includes a plurality of chips each including the image processing unit 103A and the chips are connected in series with one another.

The configurations of the image processing units 103A and 103B are described. As described above, the image processing unit 103A and the image processing unit 103B include the same configuration. Accordingly, in the following descriptions, the configuration of the image processing unit 103A is first described. As for the image processing unit 103B, parts different from the image processing unit 103A are described. In FIG. 1, members included in the image processing unit A are denoted by reference numerals with a branch number of "1" at the end. In addition, members included in the image processing unit B are denoted by reference numerals with a branch number of "2" at the end.

The image processing unit 103A includes a first input terminal 104-1 that is a first input portion receiving an image signal from the imaging unit 102. In addition, the image processing unit 103A includes a signal processing unit 130-1. The signal processing unit 130-1 includes an input/output buffer unit 119-1, a delay addition unit 108-1, and a format conversion unit 106-1. The input/output buffer unit 119-1 buffers the image signal input to the first input terminal 104-1, and outputs the buffered image signal to a first output terminal 105-1 that is a first output portion. A first image signal that is an image signal output from the first output terminal 105-1 to outside of the image processing unit 103A, is the image signal that has been output by the imaging unit 102 and then buffered. The number of pixels of the first image signal output from the first output terminal 105-1 is equal to 12K9K that is the number of pixels of the image signal output by the imaging unit 102. In other words, the first image signal includes about one hundred million signals.

Further, the input/output buffer unit 119-1 outputs the image signal to the delay addition unit 108-1. The delay addition unit 108-1 outputs, to the format conversion unit 106-1, the image signal that is obtained by delaying the image signal output from the input/output buffer unit 119-1. The image signal output by the delay addition unit 108-1 is also a signal including 12K9K pixels that is the number of pixels corresponding to all of the pixels of the imaging unit 102.

The format conversion unit 106 performs processing to reduce resolution of the image signal output from the delay addition unit 108-1, thereby generating a second image signal. The processing to reduce the resolution includes any of addition, averaging, and thinning of signals of the plurality of pixels, or a combination thereof. The resolution of the second image signal generated through the processing by the format conversion unit 106-1 is lower than the resolution of the first image signal output from the first output terminal 105-1. The resolution can be handled, in the imaging unit 102, as the number of signals per unit area of a light receiving surface into which light enters. In other words, "reduction of resolution" indicates reduction of the number of signals per unit area of the light receiving surface. In the present exemplary embodiment, the resolution is reduced from the 12K9K image signal to one-sixth in the horizontal direction and one-fourth in the vertical direction. As a result, the format conversion unit 106 generates an image signal in HD format (2K1K pixels) that includes a data amount equal to about 1/24 of the data amount of the 12K9K image signal. Accordingly, the second image signal includes about two million signals. Therefore, two million that is the number of second signals included in the second image signal is smaller than about one hundred million that is the number of first signals included in the first image signal.

A second output terminal 107-1 is a second output portion that outputs, to the outside of the image processing unit 103A, the second image signal output from the format conversion unit 106-1.

Next, the image processing unit 103B is described.

The image signal with 12K9K pixels is output to a first input terminal 104-2 from the input/output buffer unit 119-1 of the image processing unit 103A. The image signal delayed by a delay addition unit 108-2 is input to a format conversion unit 106-2.

The format conversion unit 106-2 clips a partial region of one-sixth in the horizontal direction and one-fourth in the vertical direction of the image signal with the 12K9K pixels. Through this operation, the format conversion unit 106-2 generates a third image signal that corresponds to a partial image in the HD format (2K1K) including a data amount equal to about 1/24 of the data amount of the input image signal. The resolution of the third image signal is equal to the resolution of the first image signal because the third image signal is the partial image of the first image signal. The number of signals included in the third image signal, however, is about two million that is the same as the number of signals included in the second image signals.

A second output terminal 107-2 is a third output portion that outputs, to outside of the image processing unit 103B, the third image signal output from the format conversion unit 106-2.

Next, an identification number holding unit 109-1 and the delay addition unit 108-1 included in the image processing unit 103A, and an identification number holding unit 109-2 and the delay addition unit 108-2 included in the image processing unit 103B are described.

The identification number holding unit 109-1 holds an identification number to identify the image processing unit 103A from the plurality of image processing units. In addition, the identification number holding unit 109-2 holds an identification number to identify the image processing unit 103B from the plurality of image processing units.

The identification number held by the identification number holding unit 109-1 is output to a timing control unit 114 through a terminal 112-1. The identification number held by the identification number holding unit 109-2 is output to the timing control unit 114 through a terminal 112-2.

The timing control unit 114 outputs delay setting information corresponding to the identification numbers input from the identification number holding unit 109-1 and the identification number holding unit 109-2, to the delay addition units 108-1 and 108-2 through the terminals 111-1 and 111-2.

As a result, different delay amounts are set to the delay addition unit 108-1 and the delay addition unit 108-2. In the present exemplary embodiment, the delay setting information is set in such a manner that the delay amount of the delay addition unit 108-2 becomes larger than the delay amount of the delay addition unit 108-1.

The imaging apparatus further includes a first image recognition unit 115 and a second image recognition unit 116. The second image output from the second output terminal 107-1 is input to the first image recognition unit 115. The first image recognition unit 115 uses the second image signal of a plurality of frames to perform detection of a movable body (motion detection) in an imaging scene.

The third image signal output from the second output terminal 107-2 is input to the second image recognition unit 116. The second image recognition unit 116 uses the third image signal of the plurality of frames to perform object recognition (e.g., detection of human faces, or detection of objects matched with specific condition) in the imaging scene.

The imaging apparatus includes a first image display unit 117 and a second image display unit 118. The first image display unit 117 displays the motion-detected image signal output from the first image recognition unit 115. The second image display unit 118 displays the object-recognized image signal output from the second image recognition unit 116.

FIG. 2 is a timing chart illustrating an operation of the imaging apparatus illustrated in FIG. 1.

In FIG. 2, a reference sign VD indicates a vertical synchronization signal. When a signal level of the vertical synchronization signal VD becomes an active level, vertical scanning of the pixels in the imaging unit 102 is performed. As a result, the image signal is output from the imaging unit 102 to the image processing unit 103A. One frame period is a period after the vertical synchronization signal VD becomes active until the vertical synchronization signal VD becomes active again.

The image signal output from the first output terminal 105-1 is a signal including substantially no delay (by 0 frame) relative to the image signal input to the input terminal 104-1. To be strict, there is signal delay caused by buffer operation of the input/output buffer unit 119-1. However, the signal delay is regarded as substantially zero in this case.

The timing control unit 114 sets the delay amount of the delay addition unit 108-1 to zero.

Signal delay by one frame is caused by the signal processing of the format conversion unit 106-1. Accordingly, the image signal output from the second output terminal 107-1 includes the signal delay by one frame relative to the image signal input to the input terminal 104-1.

The first image recognition unit 115 takes an image processing time for about one frame to perform motion detection in the image information of the second image signal output from the second output terminal 107-1. Accordingly, the image signal displayed by the first image display unit 117 includes the signal delay by two frames relative to the image signal input to the first input terminal 104-1.

The timing control unit 114 sets the delay amount of the delay addition unit 108-2 to two frames.

As a comparative example, frames of the image signal in a case where the delay addition unit 108-2 does not delay the image signal are illustrated in "106-2 input" with parentheses in FIG. 2.

A case where a result of the motion detection by the first image recognition unit 115 is reflected on processing of the partial image generation by the format conversion unit 106-2, is considered.

In the comparative example, the result of the motion detection performed on the image signal of N-th frame by the first image recognition unit 115 (115 input illustrated in FIG. 2) is reflected on (N+2)-th frame in the processing by the format conversion unit 106-2, as illustrated as 106-2 input in FIG. 2.

On the other hand, in the present exemplary embodiment, the result of the motion detection performed on the image signal of N-th frame by the first image recognition unit 115 (115 output illustrated in FIG. 2) is reflected on the same N-th frame in the processing by the format conversion unit 106-2, as illustrated as 106-2 input in FIG. 2.

Further description is given with reference to FIGS. 3A, 3B, 4A, and 4B.

Figure 3B:
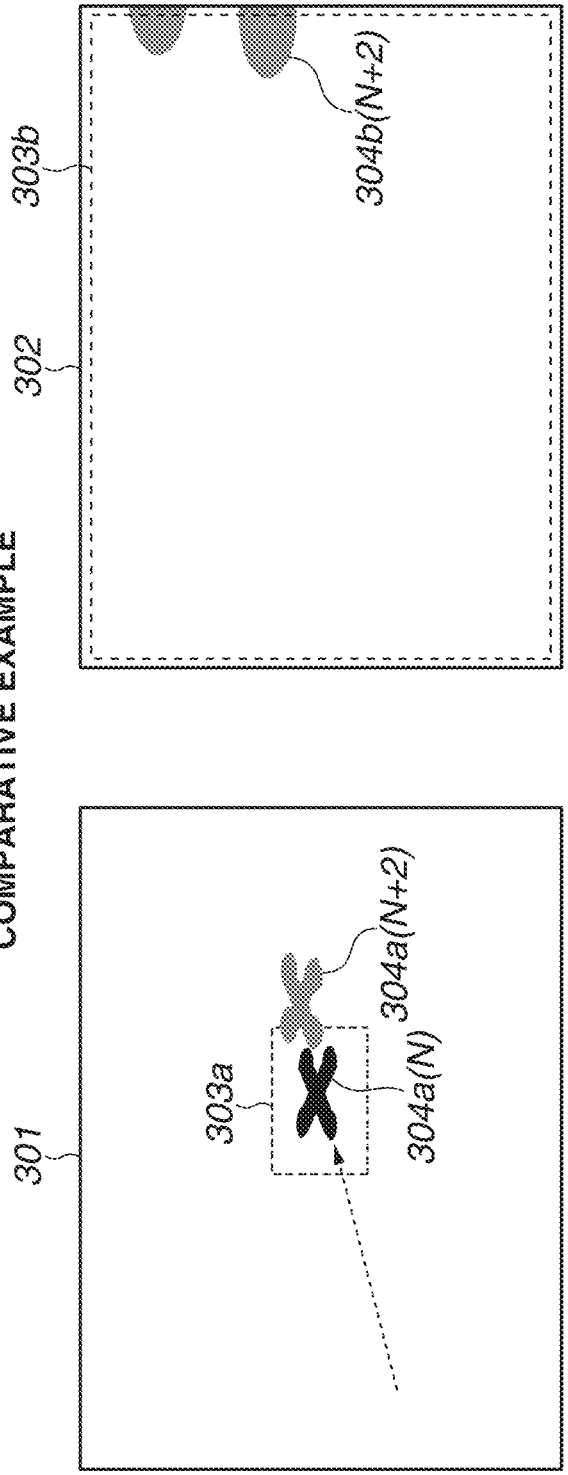

FIGS. 3A and 3B illustrate the comparative example out of the comparative example and the present exemplary embodiment illustrated in FIG. 2. On the other hand, FIGS. 4A and 4B illustrate the present exemplary embodiment out of the comparative example and the present exemplary embodiment illustrated in FIG. 2.

Figure 4A:
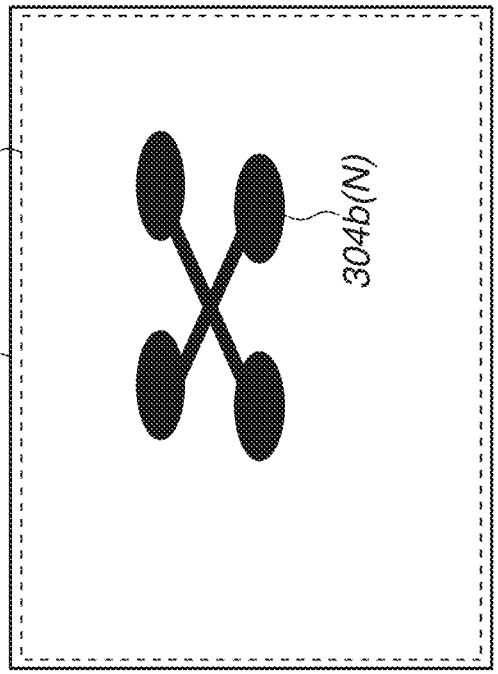
FIGS. 4A and 4B are diagrams each illustrating image processing according to an exemplary embodiment.
Figure 4B:
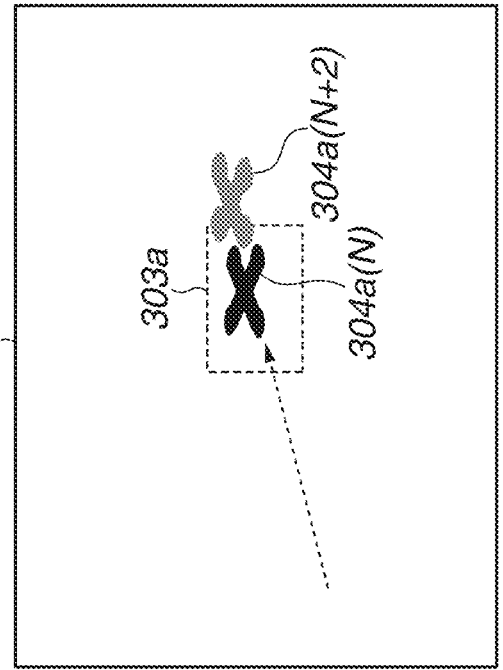

An image 301 in FIG. 3A and FIG. 4A schematically illustrates the image signal input to the first image recognition unit 115. The image 301 in FIG. 3A and FIG. 4A illustrates an imaging region corresponding to the second image signal. Further, in the present exemplary embodiment, the second image signal is generated without trimming the first image signal. Therefore, the imaging region corresponding to the second image signal is the same as the imaging scene corresponding to the first image signal. An image 302 in FIG. 3B and FIG. 4B schematically illustrates the third image signal input to the second image recognition unit 116. The image signals actually input to the first image recognition unit 115 and the second image recognition unit 116 are not the images illustrated in FIGS. 3A and 3B and FIGS. 4A and 4B. However, the image signals are schematically illustrated as the images in order to make the description easier to understand.

In FIG. 3A and FIG. 4A, an object 304a and an object 304b are flying objects such as a drone captured as an object when the sky is imaged. It is assumed that the object is located at a position 304a(N) in N-th frame, and is located at a position 304a(N+2) in (N+2)-th frame. At this time, when the image recognition unit 115 performs the motion detection and detects the moving object 304a at the position 304a(N) at a timing of N-th frame, the image recognition unit 115 outputs, to a format control unit 113, a processing result signal that indicates detection of motion within a region 303a. The region 303a is only a part of the imaging region corresponding to the second image signal. The format control unit 113 sets, as the region 303a, the region to be clipped as the partial image by the format conversion unit 106-2.

The format conversion unit 106-2 generates a partial image corresponding to the region 303a. As a result, the image signal with 2K1K pixels corresponding to the region 303a is generated. In other words, the format conversion unit 106-2 acquires, from the whole image, the image signal that corresponds to the region 303a digitally zoomed. A reference numeral 303b indicates image data of the partially-clipped region in the HD format, out of the image input to the format conversion unit 106-2.

The format conversion unit 106-2 performs processing of generating a partial image, on the image signal that is input to the format conversion unit 106-2 at the same timing as that of the image signal used in the recognition by the first image recognition unit 115.

In the comparative example, as illustrated in "106-2 input" with parentheses in FIG. 2, the image signal of (N+2)-th frame after two frames from the image signal used in the recognition by the first image recognition unit 115 is input. The format conversion unit 106-2 performs processing of generating a partial image of the region 303a, on the image signal of (N+2)-th frame. However, the object 304a is located at the position 304a(N+2) in (N+2)-th frame. Therefore, most of the object 304a does not appear in the clipped image signal of the region 303a. Accordingly, the second image recognition unit 116 cannot recognize the object 304 even through the object recognition using the image 302 is performed.

On the other hand, in the case of the present exemplary embodiment, the delay addition unit 108-2 delays the image signal by two frames. This makes it possible to reflect the result of the motion detection by the first image recognition unit 115 on the partial image generation of the image signal of the same N-th frame. As a result, it is possible to generate the partial image in which the object 304a is captured, as illustrated in FIG. 4B. This enables the second image recognition unit 116 to recognize the object 304a.

As described above, the image processing unit 103 according to the present exemplary embodiment includes the delay addition unit 105 in the preceding stage of the format conversion unit 106. The delay addition unit 105 has the configuration to change the delay addition amount for each image processing unit. This makes it possible to perform reflection, on the image signal of a predetermined frame, of the result of the image recognition using the image signal output by the image processing unit 103 in the preceding stage, on the image processing (e.g., partial image generation) of the image signal of the predetermined frame of the image processing unit 103 in the following stage.

In the present exemplary embodiment, the delay addition unit 105-2 adds delay by two frames. This is just an example, and the delay amount may be appropriately set based on a processing speed of each of the format conversion unit 106-1 and the first image recognition unit 115. Further, the setting of the delay amount may be changed according to the difference of the processing speed of each of the format conversion unit 106-1 and the first image recognition unit 115 depending on the set mode of the imaging apparatus. For example, the delay amount of the delay addition unit 105-2 may be changed according to the difference of the number of signals added by the format conversion unit 106-1.

Further, the delay amount of the delay addition unit 105-2 may be changed according to change of an output frame rate of the image signal of the imaging unit 102.

In addition, the processing speed of each of the format conversion unit 106-1 and the first image recognition unit 115 may be monitored before the actual imaging, and the delay amount of the delay addition unit 105-2 may be set based on a result of the monitoring. Furthermore, the processing speed of each of the format conversion unit 106-1 and the first image recognition unit 115 may be monitored during the actual imaging, and the delay amount of the delay addition unit 105-2 may be set based on a result of the monitoring.

In the present exemplary embodiment, the example in which, out of the plurality of image processing units 103A and 103B, the delay amount of the delay addition unit 108-2 of the image processing unit 103B located in the following stage is larger than the delay amount of the delay addition unit 108-1 of the image processing unit 103A located in the preceding stage, has been described. The delay amount is not limited to this example, and the delay amount of the delay addition unit 108 in each of the plurality of image processing units 103 may be set according to the function of each of the first image recognition unit 115 and the second image recognition unit 116.

Further, reduction of the data amount of the image signal is not limited to the conversion such as addition, averaging, thinning, and segmentation, from 12K9K pixels. For example, the data amount of the image signal may be reduced through extraction of data of a part of the imaging time. For example, the data amount may be reduced through capturing of moving image frames of the captured image of only a predetermined period, or through reduction of the number of frames by thinning, addition, averaging, etc., in a certain period of frames. More specifically, there is a frame rate conversion in which frames are thinned from the image of high frame rate of 1000 frames per second to convert the frame rate to 60 frames per second. In addition, another example includes format conversion to reduce the image data amount on a time axis, for example, conversion into a slow-motion image that is obtained by outputting a slow-motion image of 100 seconds with 60 fames from a memory while writing, into the memory, the image of six seconds output at the frame rate of 1000 frames per second. Further, the frame rate conversion and the format conversion may be combined. For example, one image processing unit 103 may perform the above-described frame rate conversion, and the other image processing unit 103 may perform the above-described format conversion. In this case, the image processing unit 103A includes a first signal processing unit generating the second image signal that includes a smaller number of signals than the signals included in the first image signal and includes the signals corresponding to the first imaging time. In addition, the image processing unit 103B includes a second signal processing unit generating the third image signal that includes a smaller number of signals than the signals included in the first image signal and corresponds to a second imaging time that is only a part of the first imaging time.

In addition, the data amount of the image signal may be reduced through selection of the pixel information corresponding to colors included in the image signal. For example, a direction of extracting a part of color information may be selected. More specifically, the imaging unit in which the color information of the pixels includes infrared (IR) pixels, in addition to red (R) pixels, green (G) pixels, and blue (B) pixels of normal Bayer arrangement, is considered. In this case, one image processing unit 103 performs format conversion to generate a color image with use of only the red (R) pixels, the green (G) pixels, and the blue (B) pixels, out of the red (R) pixels, the green (G) pixels, the blue (B) pixels, and the infrared (IR) pixels. Further, the other image processing unit 103 performs format conversion to generate an infrared image with use of at least the infrared (IR) pixels, out of the red (R) pixels, the green (G) pixels, the blue (B) pixels, and the infrared (IR) pixels. It is sufficient for the color information included in the third image signal generated by the other image processing unit 103 to be different by at least one kind from the color information included in the second image signal generated by the one image processing unit 103. In this case, the image processing unit 103A includes the first signal processing unit generating the second image signal that includes a smaller number of signals than that of the signals included in the first image signal and corresponds to the color information of only a part of the first image signal. Further, the image processing unit 103B includes the second signal processing unit generating the third image signal that includes a smaller number of signals than that of the signals included in the first image signal and includes color information different by at least one kind from the color information corresponding to the second image signal.

Further, the chip in which the image processing unit 103A is disposed and the chip in which the image processing unit 103B is disposed are the chips having the same configuration in the description of the present exemplary embodiment. However, the configuration is not limited to the example. For example, the format conversion units in the respective chips may be different in circuit from each other according to the assigned function, or the output terminal 105-2 of the image processing unit 103B may be omitted.

In addition, in the configuration described in the present exemplary embodiment, the image processing unit 103B that generates the partial image is provided in the following stage of the image processing unit 103A that generates the whole image. The configuration is not limited to the example, and the image processing unit 103A that generates the whole image may be provided in the following stage of the image processing unit 103B that generates the partial image. In this case, the image processing unit 103B as the second image processing unit includes a second input portion that receives the image signal from the imaging unit. In addition, the image processing unit 103B includes a second signal processing unit that generates the first image signal from the image signal input to the second input portion. The second signal processing unit further generates the third image signal that includes a smaller number of signals than that of the signals included in the first image signal and corresponds to the second imaging region as only a part of the first imaging region. Furthermore, the image processing unit 103B includes a third output portion that outputs the first image signal to outside of the second image processing unit and a fourth output portion that outputs the third image signal to outside of the image processing unit 103B. Further, the image processing unit 103A as the first image processing unit includes the first input portion that receives the first image signal from the third output portion. The image processing unit 103A further includes the first signal processing unit generating, from the first image signal input to the first input portion, the second image signal that includes a smaller number of signals than that of the signals included in the first image signal and corresponds to the first imaging region. Furthermore, the imaging processing unit 103A includes the second output portion that outputs the second image signal to the outside of the first image processing unit.

In the present exemplary embodiment, the example in which the imaging apparatus includes the two image processing units 103 has been described. However, the imaging apparatus may include a larger number of image processing units 103 in series. In this case, delay amounts different from one another may be preferably set to the delay addition units 105 of the respective image processing units 103. As a more preferred example, the delay amounts of the delay addition units 105 of the respective image processing units 103 are preferably increased toward the following stage.

In the present exemplary embodiment, in the imaging apparatus, each of the plurality of image processing units 103 outputs the image signal including the first number of signals from the first output terminal, and outputs the image signal of the second number of signals smaller than the first number of signals from the second output terminal. Therefore, in the configuration in which the image processing units 103 are connected in series with one another, the signal output from the imaging unit 102 is transmittable to the image processing unit 103 in the following stage, and the pixel signal, the number of signals of which is reduced to the number of signals suitable for the image processing, can be output. This enables the image processing units 103 connected in series with one another to perform different image processing in parallel.

An imaging apparatus according to a second exemplary embodiment is described focusing on differences from the first exemplary embodiment.

FIG. 5 is a block diagram illustrating a configuration of the imaging apparatus according to the second exemplary embodiment. In FIG. 5, components having the same functions as those of the components illustrated in FIG. 1 are denoted by the same reference numerals as those in FIG. 1. The image processing units 503A and 503B are different from those of the first exemplary embodiment in that the image processing unit 503A includes an input unit 501-1 and an output unit 502-1 and the image processing unit 503B includes an input unit 501-2 and an output unit 502-2.

The input unit 501-1 de-serializes the serialized image data of all of the pixels that is input to the input terminal 104-1 from the imaging unit 102, into parallel data. The image signal output from the input unit 501-1 is input to the format conversion unit 106-1. The format conversion unit 106-1 operates in the same manner as in the first exemplary embodiment.

The image signal output from the input unit 501-1 is serialized again by the output unit 502-1 after passing through a delay addition unit 508, and the serialized image signal is output from the output terminal 105-1.

In the present exemplary embodiment, the delay addition unit 508, the format conversion unit 106, the first image recognition unit 115, the second image recognition unit 116, the first image display unit 117, and the second image display unit 118 each operate in the same manner as in the first exemplary embodiment described with reference to FIG. 2.

The imaging apparatus of the second exemplary embodiment also achieves the effects same as those achieved by the imaging apparatus of the first exemplary embodiment.

An imaging apparatus according to a third exemplary embodiment is described focusing on differences from the first exemplary embodiment.

In the imaging apparatus of the first exemplary embodiment, the frame of the image signal used in the motion detection by the first image recognition unit 115 is matched with the frame of the image signal input to the format conversion unit 106-2 of the image processing unit 103B. As a result, as illustrated as "117 input" and "118 input" in FIG. 2, the image signal input to the image display unit 118 is delayed from the image signal input to the image display unit 117, by two frames of the delay caused by the delay addition unit 108-2. In a case where display of the image display units 117 and 118 are performed at the same time, sense of incongruity occurs on human eyes. In particular, in a case where a shape of the object is changed in each frame (e.g., sport scenes such as ball games and athletic sports), the sense of incongruity becomes remarkable.

In the imaging apparatus of the present exemplary embodiment, the display of the image display units are synchronized with one another in order to reduce the sense of incongruity.

Figure 6:
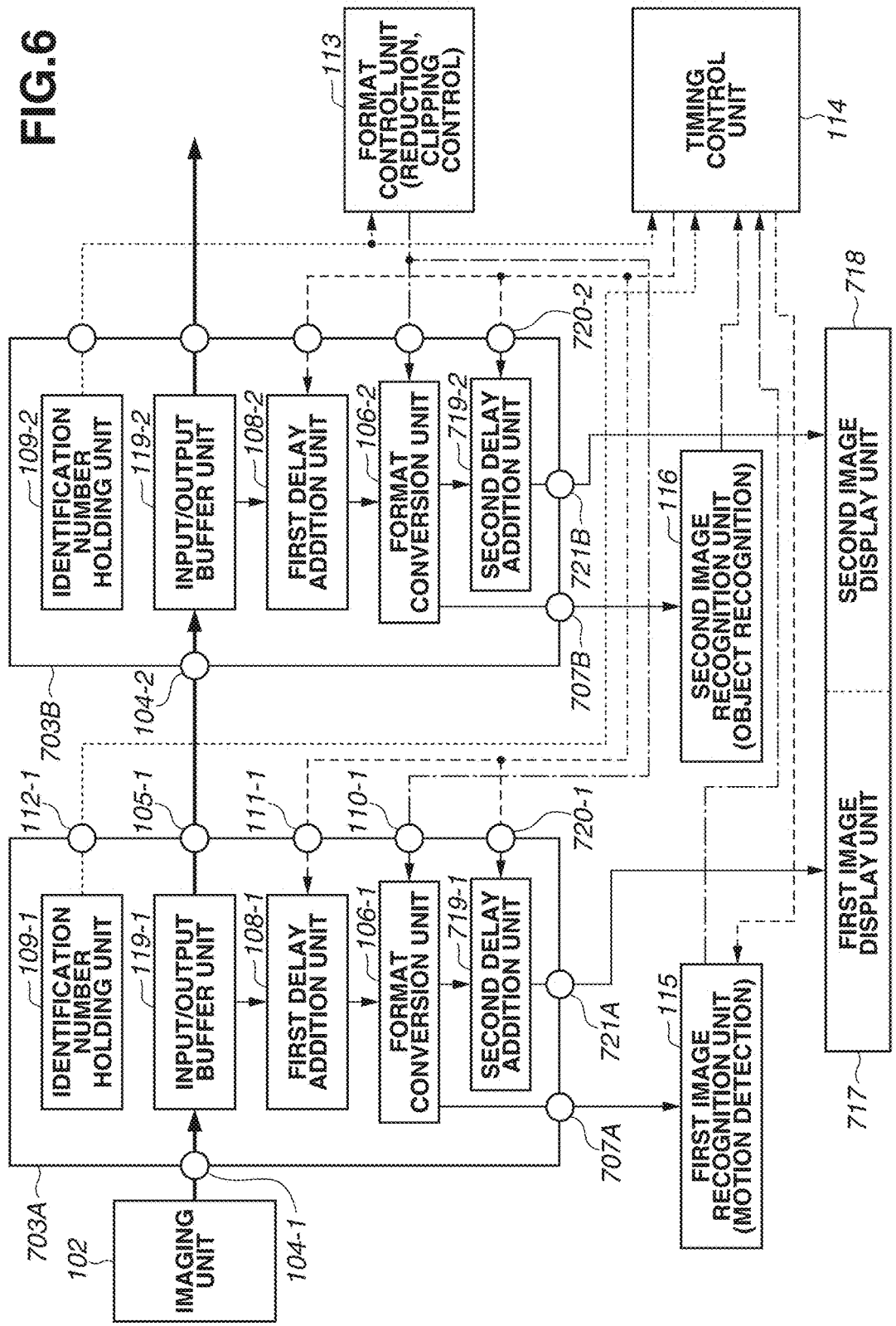
FIG. 6 is a block diagram illustrating a configuration of the imaging apparatus.

FIG. 6 is a block diagram illustrating a configuration of the imaging apparatus of the present exemplary embodiment. In FIG. 6, components having the same functions as those of the components illustrated in FIG. 1 are denoted by the same reference numerals as those in FIG. 1.

The imaging apparatus illustrated in FIG. 6 includes image processing units 703A and 703B. The image processing units 703A and 703B respectively include first delay addition units 108-1 and 108-2 that respectively correspond to the delay addition units 108-1 and 108-2 of the first exemplary embodiment. Further, the image processing units 703A and 703B respectively include second delay addition units 719-1 and 719-2 in the following stage of the format conversion units 106-1 and 106-2. Further, the image processing units 703A and 703B respectively include control terminals 720-1 and 720-2 that respectively control the second delay addition units 719-1 and 719-2, and output terminals 721A and 721B that respectively output image signals form the second delay addition units 719-1 and 719-2. The output terminal 721A is a fourth output portion outputting the second image signal.

The second delay addition units 719-1 and 719-2 respectively add delays to the image signals output from the format conversion units 106-1 and 106-2. In the present exemplary embodiment, the delay amount of the second delay addition unit 719-1 is set to two frames, and the delay amount of the second delay addition unit 719-2 is set to zero.

The image signals respectively displayed on the image display unit 717 and the image display unit 718 are based on the same frame caused by the second delay addition unit 719-1 and the second delay addition unit 719-2. This makes it possible to reduce the sense of incongruity of the displayed image occurred in the imaging apparatus according to the first exemplary embodiment.

Specific examples of the image display units 717 and 718 are described.

Figure 7:
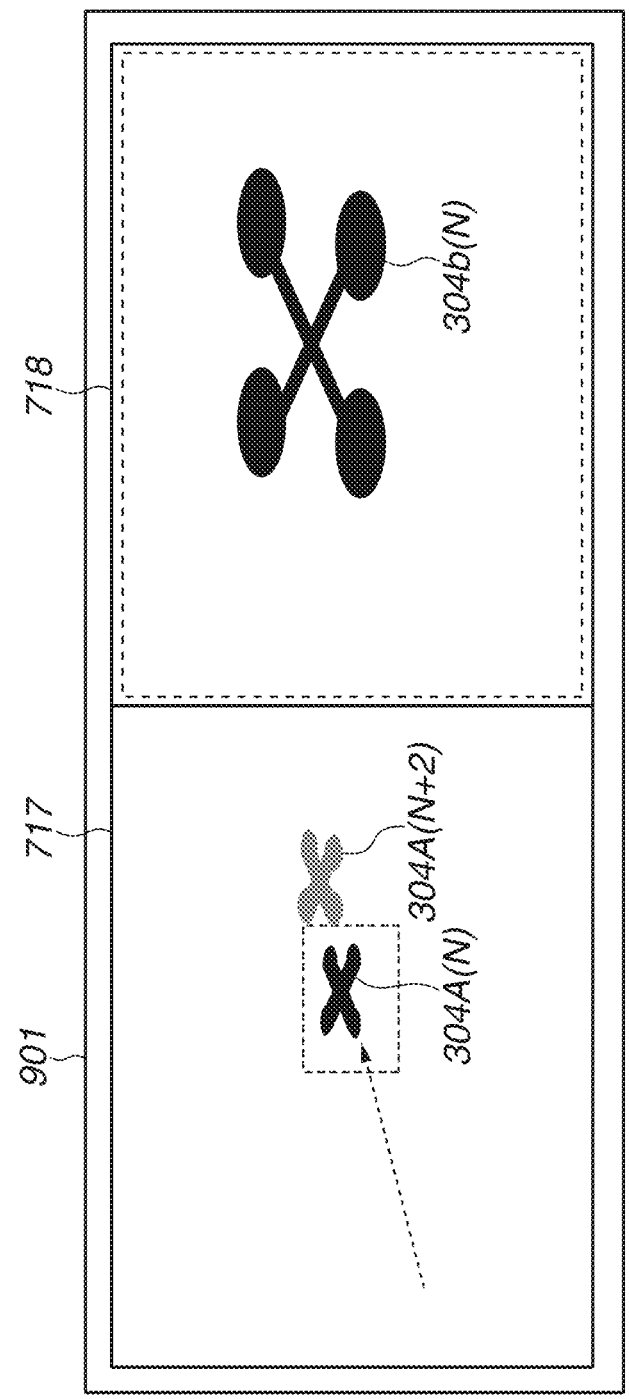
FIG. 7 is a diagram illustrating image processing according to an exemplary embodiment.

An example in which the image display units 717 and 718 are provided in one display 901 as illustrated in FIG. 7 is described. The display 901 includes a plurality of image input terminals, and a part of a region functions as the image display unit 717 and the other part of the region functions as the image display unit 718. This enables the display 901 to display the plurality of images on one screen. In the present exemplary embodiment, the display 901 is a display including 3840 pixels in the horizontal direction and 1080 pixels in the vertical direction (4K1K), and a left-half region 1 including 1096 pixels in the horizontal direction and 1080 pixels in the vertical direction (2K1K) functions as the image display unit 717.

On the other hand, a right-half region 2 including 1096 pixels in the horizontal direction and 1080 pixels in the vertical direction (2K1K) functions as the image display unit 718.

In FIG. 7, an image by the operation of the present exemplary embodiment is displayed. In the first exemplary embodiment, the images to be displayed are based on different frames between the image display units due to delay of two frames. In the present exemplary embodiment, the images to be respectively displayed by the image display units 717 and 718 are based on the same frame. This makes it possible to reduce the sense of incongruity of the displayed image occurred in the imaging apparatus of the first exemplary embodiment.

In a fourth exemplary embodiment, an example of preferred layout of the plurality of image processing units is described.

A method of stacking semiconductor chips is well-known. Stacking the semiconductor chips makes it possible to reduce the number of wirings and the length of the wirings as compared with a case where the semiconductor chips are arranged in a plane. As a result, it is possible to downsize a circuit substrate or a system.

In the present exemplary embodiment, a stacked image processing integrated circuit in which a plurality of semiconductor chips each including one image processing unit described in the first to third exemplary embodiments, and a semiconductor chip including the imaging unit are stacked is described.

Figure 8A:
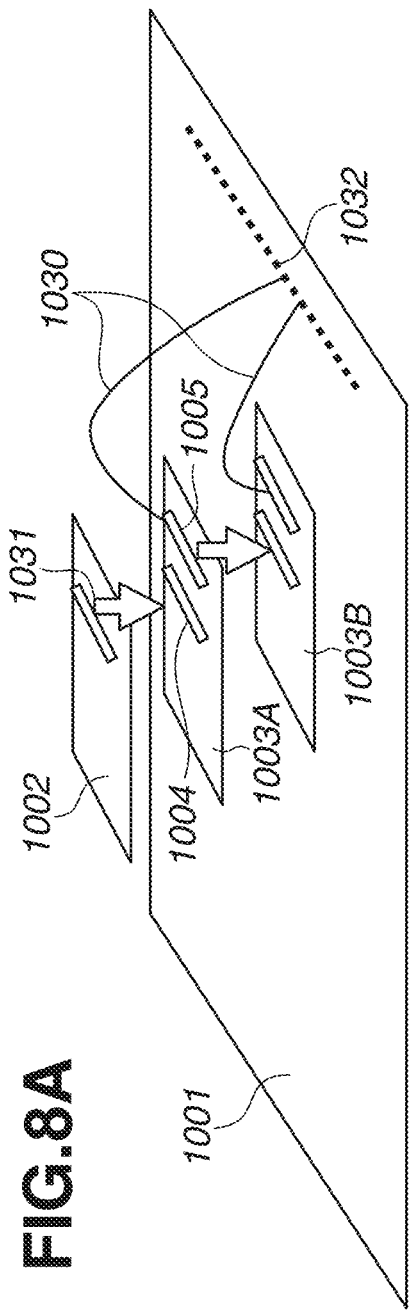
FIGS. 8A and 8B are diagrams illustrating layout of the imaging apparatus.

FIG. 8A is a diagram schematically illustrating a physical configuration of the stacked image processing integrated circuit. A package 1001 contains the image processing integrated circuit in which three semiconductor chips are stacked. In FIG. 8A, sealing of the package, glass to which light enters, and an electrode drawn to the outside are omitted in illustration. A wire bonding pad 1032 is electrically connected to an external electrode (not illustrated). In addition, a semiconductor chip 1002 is a chip including the imaging unit that is known as a charge-coupled device (CCD) sensor or a CMOS sensor and includes a pixel unit and an analog-to-digital (AD) conversion unit of the pixel signal. Further, each of a semiconductor chip 1003A and a semiconductor chip 1003B is an image processing chip in which the image processing unit of any of the first to third exemplary embodiments is provided. Each of the semiconductor chips 1002, 1003A, and 1003B includes a through electrode for connecting the stacked chips. A through electrode 1031 for connecting with the semiconductor chip 1003A for image processing is provided on bottom surface side opposite to a top surface that is provided with the imaging unit, in the semiconductor chip 1002 including the imaging unit.

Further, each of the semiconductor chips 1002, 1003A, and 1003B includes an electrode for connecting a wire bonding to output an electric signal from each of the semiconductor chips to the package. The semiconductor chip 1003A includes an electrode 1005 and a through electrode 1004. The electrode 1005 is connected to the wire bonding to output the electric signal to the package. The through electrode 1004 is provided on a surface opposite to a surface that is provided with the electrode 1005, and is connected to the semiconductor chip 1003B. The semiconductor chip 1003B also has the same structure.

Figure 8B:
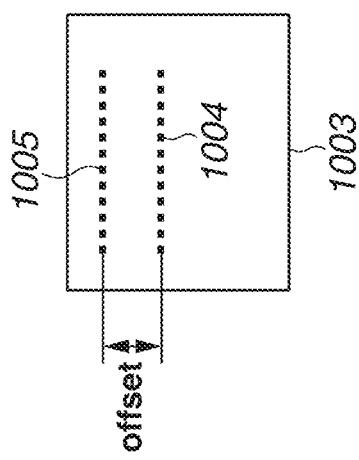

FIG. 8B is a diagram illustrating a planar layout of each of the semiconductor chip 1003A and the semiconductor chip 1003B. A positional relationship between the electrode 1005 for wire bonding provided on the top surface and the through electrode 1004 provided on the bottom surface is illustrated in a perspective view for schematic illustration. Since the image processing chips are stacked, the electrode 1005 for wire bonding and the through electrode 1004 provided on the bottom surface are offset from each other in order to connect the wire bonding to the electrode 1005 after stacking.

As described above, it is possible to realize the image processing integrated circuit in which the plurality of image processing units and the imaging unit are stacked.

In the present exemplary embodiment, the example in which the semiconductor chip 1002, the semiconductor chip 1003A, and the semiconductor chip 1003B are stacked has been described. The configuration of the present exemplary embodiment is not limited to the example. For example, the semiconductor chip 1003A and the semiconductor chip 1003B may be arranged in a plane, and the semiconductor chip 1002 may be stacked with respect to the two semiconductor chips 1003A and 1003B that are arranged in a plane.

Figure 9:
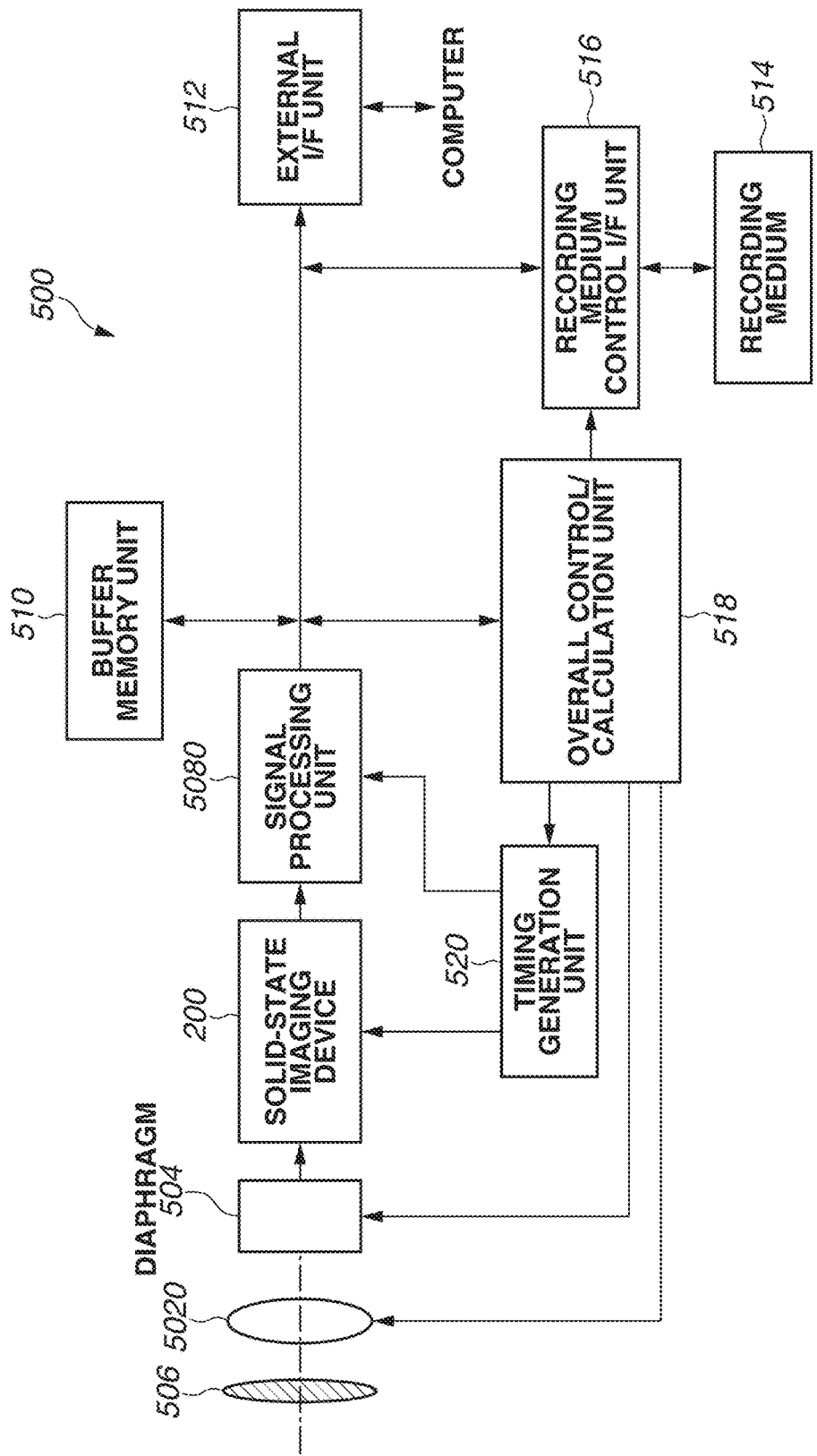
FIG. 9 is a diagram illustrating a configuration of an imaging system.

FIG. 9 is a block diagram illustrating a configuration of an imaging system 500 according to a fifth exemplary embodiment. The imaging system 500 of the present exemplary embodiment includes a solid-state imaging device 200 to which the configuration of any of the imaging devices described in the respective exemplary embodiments described above is applied. Specific examples of the imaging system 500 include a digital still camera, a digital camcorder, and a monitor camera. FIG. 9 illustrates a configuration example of a digital still camera to which any of the imaging apparatuses in the above-described respective exemplary embodiments is applied as the solid-state imaging device 200.

The imaging system 500 illustrated in FIG. 9 includes the solid-state imaging device 200, a lens 5020 that forms an optical image of an object on the solid-state imaging device 200, a diaphragm 504 for changing an amount of light passing through the lens 5020, and a barrier 506 for protecting the lens 5020. The lens 5020 and the diaphragm 504 are included in an optical system that condenses the light onto the solid-state imaging device 200.

The imaging system 500 further includes a signal processing unit 5080 that performs processing of an output signal output from the solid-state imaging device 200. The signal processing unit 5080 performs operation of the signal processing in which various kinds of correction and compression are performed on the input signal and the resultant signal is output, as necessary. The signal processing unit 5080 may include a function of performing AD conversion processing on the output signal output from the solid-state imaging device 200. In this case, the solid-state imaging apparatus does not necessarily include the AD conversion circuit.

The imaging system 500 further includes a buffer memory unit 510 that temporarily holds image data, and an external interface unit (external I/F unit) 512 for communicating with an external computer and the like. Furthermore, the imaging system 500 includes a recording medium 514 such as a semiconductor memory which the image data is written to or read from, and a recording medium control interface unit (recording medium control I/F unit) 516 for writing into or reading from the recording medium. The recording medium 514 may be incorporated in the imaging system 500 or may be attachable thereto and detachable therefrom.

The imaging system 500 further includes an overall control/calculation unit 518 that performs various kinds of calculations and controls the entire digital still camera, and a timing generation unit 520 that outputs various kinds of timing signals to the solid-state imaging device 200 and the signal processing unit 5080. In this case, the timing signal may be input from the outside, and it is sufficient for the imaging system 500 to include at least the solid-state imaging device 200 and the signal processing unit 5080 that processes the output signal output from the solid-state imaging device 200. The overall control/calculation unit 518 and the timing generation unit 520 may be configured so as to perform a part or all of the control functions for the solid-state imaging device 200.

The solid-state imaging device 200 outputs the image signal to the signal processing unit 5080. The signal processing unit 5080 performs predetermined signal processing on the image signal output from the solid-state imaging device 200, and outputs image data. Further, the signal processing unit 5080 generates an image by using the image signal.

Configuring the imaging system with use of the solid-state imaging device including any of the imaging devices in the above-described respective exemplary embodiments makes it possible to realize the imaging system that acquires the image with high quality.

Figure 10A:
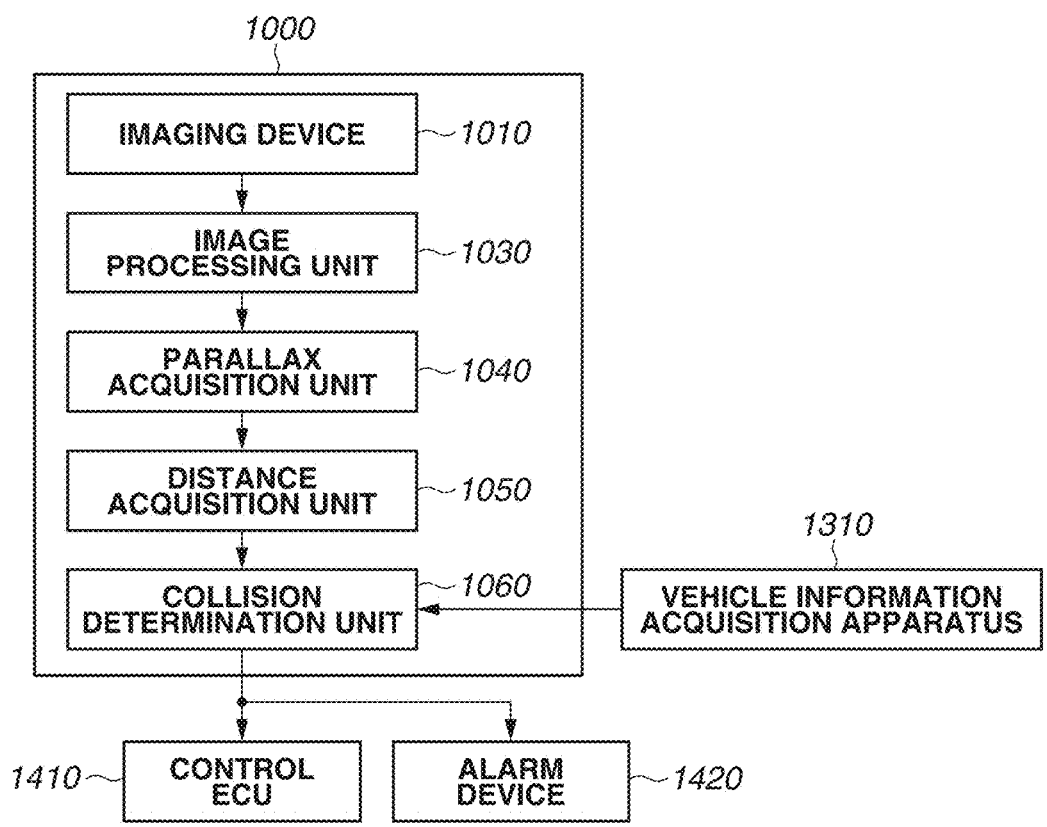
FIGS. 10A and 10B are block diagrams illustrating a configuration of a movable body.
Figure 10B:
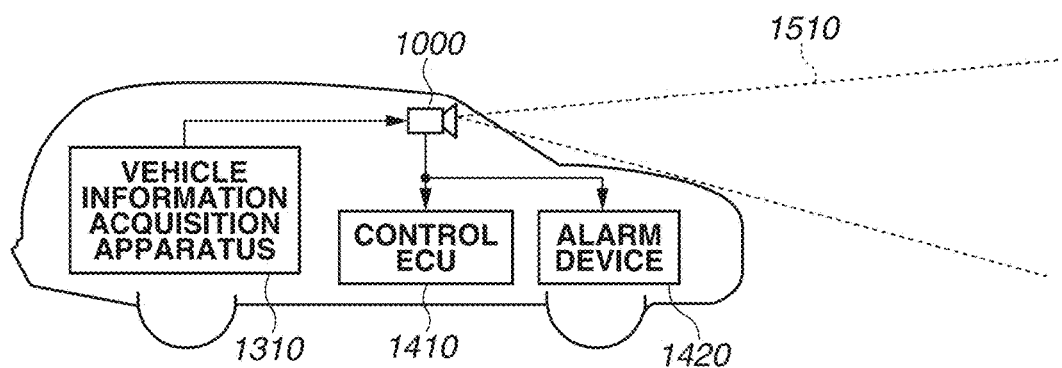

FIGS. 10A and 10B are diagrams respectively illustrating a configuration of an imaging system 1000 and a configuration of a movable body according to a sixth exemplary embodiment. FIG. 10A illustrates an example of an imaging system 1000 relating to an onboard camera. The imaging system 1000 includes an imaging device 1010. The imaging device 1010 is any of the imaging devices of the above-described respective exemplary embodiments. The imaging system 1000 includes an image processing unit 1030 that performs image processing on a plurality of pieces of image data acquired by the imaging device 1010, and a parallax acquisition unit 1040 that calculates parallax (phase difference of parallax images) from the plurality of pieces of image data acquired by the imaging system 1000. The imaging system 1000 further includes a distance acquisition unit 1050 that calculates a distance to a target object based on the calculated parallax, and a collision determination unit 1060 that determines whether there is a possibility of collision based on the calculated distance. The parallax acquisition unit 1040 and the distance acquisition unit 1050 are examples of a distance information acquisition unit that acquires information of the distance to the target object. In other words, the distance information is information relating to, for example, parallax, a de-focusing amount, and the distance to the target object. The collision determination unit 1060 may use any of the distance information to determine the collision possibility. The distance information acquisition unit may be realized by specially-designed hardware or a software module. In addition, the distance information acquisition unit may be realized by, for example, field programmable gate array (FPGA), an application specific integrated circuit (ASIC), or a combination thereof.

The imaging system 1000 is connected to a vehicle information acquisition apparatus 1310, and can acquire vehicle information such as a vehicle speed, a yaw rate, and a steering angle. Further, a control electronic control unit (ECU) 1410 is connected to the imaging system 1000. The control ECU 1410 is a controller that outputs a control signal to generate braking force with respect to the vehicle, based on a result of the determination by the collision determination unit 1060. In other words, the control ECU 1410 is an example of a movable body control unit that controls the movable body based on the distance information. Further, the imaging system 1000 is also connected to an alarm device 1420 that generates an alarm to a driver, based on the result of the determination by the collision determination unit 1060. For example, in a case where the collision possibility is high as the result of the determination by the collision determination unit 1060, the control ECU 1410 performs vehicle control such as breaking, returning of an accelerator, and suppressing engine output to avoid collision and to reduce damage. The alarm device 1420 gives warning to a user through, for example, making an alarm sound, displaying alarm information on a screen of a car navigation system, or vibrating a sheet belt or a steering.

In the present exemplary embodiment, the imaging system 1000 images surroundings of the vehicle, for example, front or rear of the vehicle. FIG. 10B illustrates the imaging system 1000 in a case where the front of the vehicle (imaging range 1510) is captured. The vehicle information acquisition apparatus 1310 instructs the imaging system 1000 to operate and to perform imaging. Using any of the imaging devices in the above-described respective exemplary embodiments as the imaging device 1010 makes it possible to improve accuracy of ranging in the imaging system 1000 of the present exemplary embodiment.

In the above description, the example in which controlling is performed to prevent the vehicle from colliding with other vehicles has been described. However, the present exemplary embodiment is applicable to control of automatic operation following the other vehicle, control of automatic operation without deviation from a lane, or the like. Further, the application of the imaging system is not limited to the vehicle such as an own vehicle, and the imaging system is applicable to movable bodies (movable apparatuses) such as ships, aircrafts, and industrial robots. In addition, the application of the imaging system is not limited to the movable body, and the imaging system is widely applicable to apparatuses that use object recognition, such as an intelligent transport system (ITS).

<Modifications>

The above-described exemplary embodiments merely illustrate specific examples for implementation of the present invention, and the above-described exemplary embodiments are not intended to limit the technical scope of the present invention. In other words, the present invention is implemented in various forms without departing from the technical idea or main features of the present invention. Further, the above-described exemplary embodiments may be variously combined and implemented.

According to the present disclosure, the configuration that includes the plurality of image processing units performing image processing different from one another, is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-088510, filed Apr. 27, 2017, which is hereby incorporated by reference herein in its entirety.

What is claimed is:

1. An imaging apparatus, comprising:
an imaging unit configured to output an image signal;
a first image processing unit; and
a second image processing unit,
wherein the first image processing unit includes
a first input portion configured to receive the image signal,
a first signal processing unit configured to generate a first image signal from the image signal input to the first input portion, and a second image signal including a smaller number of signals than signals included in the first image signal and corresponding to a first imaging region,
a first output portion configured to output the first image signal to outside of the first image processing unit, and
a second output portion configured to output the second image signal to the outside of the first image processing unit, and
wherein the second image processing unit includes
a second input portion configured to receive the first image signal from the first output portion,
a second signal processing unit configured to generate a third image signal from the first image signal input to the second input portion, the third image signal including a smaller number of signals than the signals included in the first image signal and corresponding to a second imaging region that is a part of the first imaging region, and
a third output portion configured to output the third image signal to outside of the second image processing unit.

2. The imaging apparatus according to claim 1, wherein the second image processing unit includes a delay addition unit that delays the first image signal input to the second input portion, and outputs the delayed first image signal to the second signal processing unit.

3. The imaging apparatus according to claim 2,
wherein the first image processing unit includes a fourth output portion outputting the second image signal to a display unit, and
wherein the fourth output potion outputs the second image signal corresponding to a predetermined frame, after the second output portion.

4. The imaging apparatus according to claim 3, wherein the third output portion outputs the third image signal of the predetermined frame during a period in which the fourth output portion outputs the second image signal of the predetermined frame.

5. The imaging apparatus according to claim 1, further comprising an image recognition unit configured to receive the second image signal from the second output portion,
wherein the imaging unit outputs the image signal of a plurality of frames to the first input portion,
wherein the image recognition unit processes the image signal of one of the plurality of frames to output a processing result signal, and
wherein the second signal processing unit generates the third image signal corresponding to the one frame, based on the processing result signal.

6. The imaging apparatus according to claim 5, wherein the second signal processing unit generates the third image signal corresponding to the one frame during a period after the image recognition unit outputs the processing result signal of the one frame until the image recognition unit outputs the processing result signal of a frame subsequent to the one frame.

7. The imaging apparatus according to claim 5,
wherein the processing result signal is a signal indicating a position of a movable body included in an imaging scene captured as the image signal, and
wherein the second signal processing unit removes, from the first image signal, a signal of a region different from a region corresponding to the position of the movable body, to generate the third image signal.

8. An imaging apparatus, comprising:
an imaging unit configured to output an image signal;
a first image processing unit; and
a second image processing unit,
wherein the second image processing unit includes
a second input portion configured to receive the image signal,
a second signal processing unit configured to generate a first image signal from the image signal input to the second input portion and a third image signal including a smaller number of signals than signals included in the first image signal and corresponding to a second imaging region that is a part of a first imaging region,
a third output portion configured to output the first image signal to outside of the second image processing unit, and
a fourth output portion configured to output the third image signal to the outside of the second image processing unit, and
wherein the first image processing unit includes
a first input portion configured to receive the first image signal from the third output portion,
a first signal processing unit configured to generate, from the first image signal input to the first input portion, a second image signal including a smaller number of signals than the signals included in the first image signal and corresponding to the first imaging region, and
a second output portion configured to output the second image signal to outside of the first image processing unit.

9. An imaging apparatus, comprising:
an imaging unit configured to output an image signal;
a first image processing unit; and
a second image processing unit,
wherein the first image processing unit includes
a first input portion configured to receive the image signal,
a first signal processing unit configured to generate a first image signal from the image signal input to the first input portion, and a second image signal including a smaller number of signals than signals included in the first image signal and including signals corresponding to a first imaging time,
a first output portion configured to output the first image signal to outside of the first image processing unit, and
a second output portion configured to output the second image signal to the outside of the first image processing unit, and
wherein the second image processing unit includes a second input portion configured to receive the first image signal from the first output portion, a second signal processing unit configured to generate, from the first image signal input to the second input portion, a third image signal including a smaller number of signals than the signals included in the first image signal and corresponding to a second imaging time that is a part of the first imaging time, and a third output portion configured to output the third image signal to outside of the second image processing unit.

10. An imaging apparatus, comprising:

an imaging unit configured to output an image signal;

a first image processing unit; and a second image processing unit, wherein the first image processing unit includes
- a first input portion configured to receive the image signal,
- a first signal processing unit configured to generate a first image signal from the image signal input to the first input portion and a second image signal including a smaller number of signals than signals included in the first image signal and corresponding to color information of a part of the first image signal,
- a first output portion configured to output the first image signal to outside of the first image processing unit, and
- a second output portion configured to the second image signal to the outside of the first image processing unit, and wherein the second image processing unit includes
- a second input portion configured to receive the first image signal from the first output portion,
- a second signal processing unit configured to generate, from the first image signal input to the second input portion, a third image signal including a smaller number of signals than the signals included in the first image signal and including color information different by at least one kind from color information included in the second image signal, and
- a third output portion configured to output the third image signal to outside of the second image processing unit.

11. The imaging apparatus according to claim 1, wherein the first image processing unit is provided on a first chip, wherein the second image processing unit is provided on a second chip, wherein the imaging unit is provided on a third chip, and wherein the first chip, the second chip, and the third chip are stacked.

12. The imaging apparatus according to claim 1, wherein the first image processing unit is provided on a first chip, wherein the second image processing unit is provided on a second chip, wherein the imaging unit is provided on a third chip, and wherein the third chip is stacked on a substrate on which the first chip and the second chip are provided.

13. An imaging system, comprising:

the imaging apparatus according to claim 1; and an optical system configured to condense light onto the imaging apparatus.

14. An imaging system, comprising:

the imaging apparatus according to claim 8; and an optical system configured to condense light onto the imaging apparatus.

15. An imaging system, comprising:

the imaging apparatus according to claim 9; and an optical system configured to condense light onto the imaging apparatus.

16. An imaging system, comprising:

the imaging apparatus according to claim 10; and an optical system configured to condense light onto the imaging apparatus.

17. A movable body comprising:

the imaging apparatus according to claim 1, a control unit configured to control movement of the movable body, based on a signal output from the imaging apparatus.

18. A movable body comprising:

the imaging apparatus according to claim 8, a control unit configured to control movement of the movable body, based on a signal output from the imaging apparatus.

19. A movable body comprising:

the imaging apparatus according to claim 9, a control unit configured to control movement of the movable body, based on a signal output from the imaging apparatus.

20. A movable body comprising:

the imaging apparatus according to claim 10, a control unit configured to control movement of the movable body, based on a signal output from the imaging apparatus.

* * * * *